United States Patent [19]

Okada

[11] Patent Number: 5,721,030
[45] Date of Patent: Feb. 24, 1998

[54] TUBULAR MEMBER

[75] Inventor: Muneki Okada, Hashimoto, Japan

[73] Assignee: Shimano, Inc., Osaka, Japan

[21] Appl. No.: 590,055

[22] Filed: Jan. 16, 1996

[51] Int. Cl.$^6$ .............................. B32B 1/08; A63B 53/10; B29D 23/00
[52] U.S. Cl. ........................ 428/36.3; 473/319; 473/318; 43/18.5; 428/408
[58] Field of Search ................................ 473/319, 318; 43/18.5; 428/36.1, 36.3, 408

[56] References Cited

U.S. PATENT DOCUMENTS

| | | | |
|---|---|---|---|
| 2,749,643 | 6/1956 | Scott | 473/319 X |
| 4,000,896 | 1/1977 | Lauraitis | 473/319 |
| 4,135,035 | 1/1979 | Branen et al. | 473/319 X |
| 5,143,374 | 9/1992 | Shibasaki | 473/319 |
| 5,156,396 | 10/1992 | Akatsuka et al. | 273/80 |
| 5,326,099 | 7/1994 | Yamamoto et al. | 473/319 X |
| 5,397,636 | 3/1995 | Miyao et al. | 428/36.3 X |
| 5,437,450 | 8/1995 | Akatsuka et al. | 473/319 X |
| 5,545,094 | 8/1996 | Hsu | 473/319 X |

FOREIGN PATENT DOCUMENTS

| | | |
|---|---|---|
| 5-103566 | 4/1993 | Japan. |
| 5-304860 | 11/1993 | Japan. |
| 1451713 | 10/1976 | United Kingdom. |
| 1510935 | 5/1978 | United Kingdom. |
| 2281491 | 3/1995 | United Kingdom. |

OTHER PUBLICATIONS

S. Yamano, "Carbon Fibers", In *Carbon Fiber* 1965, Chapter D1, pp. D-1 to D-7 (Toray Corporation ACM Technical Group, Tokyo, Japan 1986) (original and English translation).

*Primary Examiner*—Daniel Zirker
*Attorney, Agent, or Firm*—Jeffer, Mangels, Butler & Marmaro LLP

[57] ABSTRACT

A tubular member for use as a fishing rod, a golf club shaft or the like, in which the member is formed of a plurality of layers containing carbon fiber impregnated with resin, with the layers being overlaid one on another. According to the present invention, the tubular member includes an inner layer formed of carbon fiber and resin and configured into a tubular shape, an intermediate layer including a plurality of layers formed of carbon fiber and resin, and an outer layer formed of carbon fiber and resin and configured into a tubular shape. At least one of the plurality of layers together forming the intermediate layer contains pitch type carbon fiber.

18 Claims, 5 Drawing Sheets

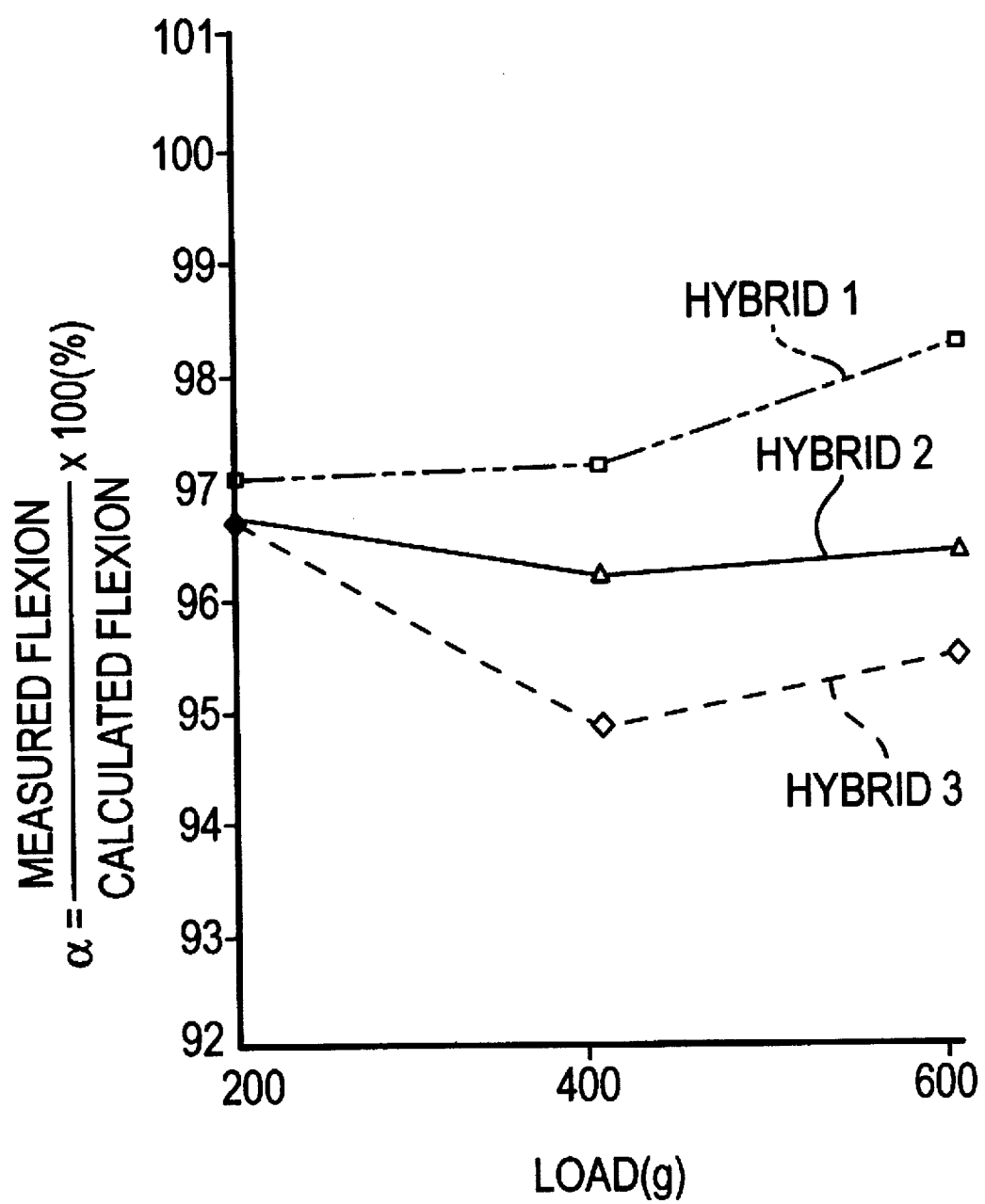

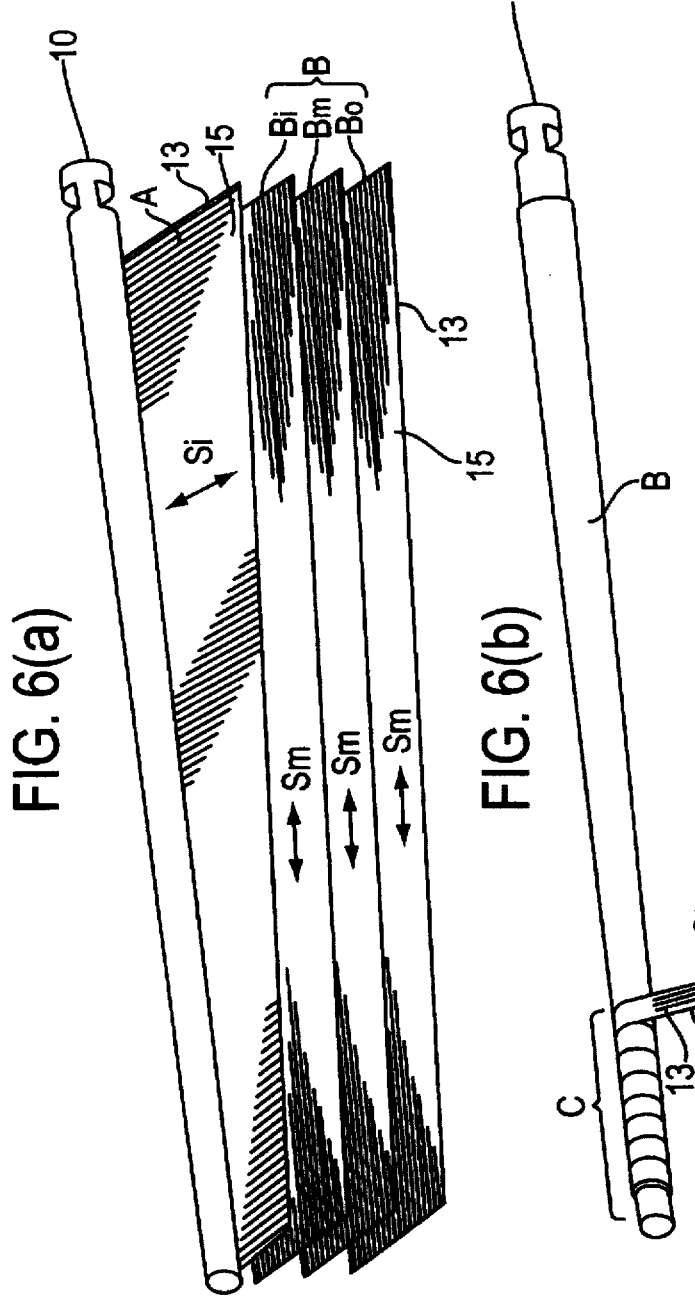

TUBULAR MEMBER

FIELD OF THE INVENTION

The present invention relates to a tubular member comprising winding of a plurality of layers of prepreg for use as e.g. a fishing rod, a shaft of a golf club.

BACKGROUND OF THE INVENTION

In a conventional tubular member of the above-described type, an intermediate layer thereof is formed by winding prepreg of PAN type carbon fiber. PAN type carbon fibers are manufactured from acrylic fibers, and are widely used in sporting goods, aerospace, industrial and other applications. PAN type carbon fibers display a good balance of high specific strength and modulus of elasticity.

With the above construction, the tubular member provides a progressively higher modulus of elasticity with increase in a bending amount of the member, thus tending to lose its flexibility gradually. For instance, Table 1 and FIG. 1 show ratios a between measured values of flexion amount and theoretically calculated values (i.e. theoretical values) of the same. For obtaining the theoretical flexion amount values, a modulus of elasticity obtained by a flexion experiment using a flat plate is newly calculated through its conversion into a volumetric content of the amount of carbon fiber, and then from this converted bending elastic modulus (shown, e.g., in Tables 1 and 2 below) the theoretical value is derived.

TABLE 1

|  | Load (g) | Flexion W (mm) measured | Flexion W (mm) calculated | α = measured calculated × 100 (%) | Bending Elastic Modulus (ton/mm2) |
|---|---|---|---|---|---|
| PAN 60 ton/mm²* | 200 | 80.3 | 84.0 | 95.5 | 29.90 |
|  | 400 | 166.8 | 177.6 | 93.9 |  |
|  | 600 | 259.3 | 276.4 | 93.8 |  |
| PAN 55 ton/mm² | 200 | 87.0 | 86.9 | 100.1 | 28.50 |
|  | 400 | 181.3 | 183.8 | 98.6 |  |
|  | 600 | 281.5 | 288.6 | 97.5 |  |
| PAN 50 ton/mm² | 200 | 91.0 | 94.0 | 96.8 | 25.00 |
|  | 400 | 191.3 | 198.8 | 96.2 |  |
|  | 600 | 298.0 | 312.1 | 95.5 |  |
| PAN 46 ton/mm² | 200 | 97.5 | 96.8 | 100.7 | 23.40 |
|  | 400 | 203.8 | 204.9 | 99.4 |  |
|  | 600 | 317.3 | 321.7 | 98.6 |  |
| PAN 40 ton/mm² | 200 | 106.3 | 107.9 | 98.5 | 19.50 |
|  | 400 | 221.0 | 228.5 | 98.7 |  |
|  | 600 | 344.0 | 358.9 | 95.8 |  |
| PAN 35 ton/mm² | 200 | 110.3 | 114.7 | 96.1 | 17.60 |
|  | 400 | 230.1 | 245.1 | 93.9 |  |
|  | 600 | 359.5 | 384.9 | 93.4 |  |
| PAN 30 ton/mm² | 200 | 124.8 | 125.0 | 99.8 | 15.30 |
|  | 400 | 263.5 | 269.6 | 97.7 |  |
|  | 600 | 410.0 | 419.9 | 97.6 |  |

*Figures indicate fiber modulus of elasticity.

However, in many cases, the measured flexion amount value and the theoretical flexion amount value do not agree with each other due to, e.g., possible variations in the amount of carbon fiber or the amount of resin due to the composition of the employed materials. As may be clearly understood from FIG. 1, in the case of a tubular member comprised of PAN carbon fiber prepreg, the ratio α between the measured flexion amount value and the theoretical flexion amount value becomes smaller with increase of the load used in the experiment, i.e. with increase in the amount of flexion. This means that with an increase in the flexion amount the measured elastic modulus becomes higher than that used in the theoretical calculation, thus resulting in decrease of flexibility.

For this reason, with the conventional fishing rod having an intermediate layer formed of PAN carbon fiber, when the rod is bent by pulling a fish, the rod loses its flexibility. The rod thus fails to provide sufficient elasticity to cope with a relatively strong pulling force from the fish, whereby breakage of the fishing line or detachment of the hook from the fish tends to occur. Further, because of the difference between the flexion amount when a fish is hooked and that when no fish is hooked, the rod provides different feels, which make the fishing activity per se difficult.

Similarly, if the above-described tubular member is employed as a shaft of a golf club, when the face of the club is hard struck deep into the ground, the club shaft is significantly bent and loses much of its flexibility at the same time. Hence, the club shaft may be readily damaged thereby.

One conceivable method to solve the above-described inconvenience is use of the pitch carbon fiber along the axial (or longitudinal) direction of the intermediate layer. Pitch carbon fibers, used in spacecraft and other applications, are produced from highly refined petroleum or coal tar pitch, and are characterized by high thermal conductivity and low coefficient of thermal expansion, among other properties. The modulus of elasticity of pitch carbon fibers can range from 60 to 900 GPa.

Table 2 and FIG. 2 show characteristics relating to flexion amounts W of rods having an intermediate layer formed of prepreg containing pitch type carbon fiber impregnated with resin.

TABLE 2

|  | Load (g) | Flexion W (mm) measured | Flexion W (mm) calculated | α = measured calculated × 100 (%) | Bending Elastic Modulus (ton/mm2) |
|---|---|---|---|---|---|
| pitch 60 ton/mm²* | 200 | 89.8 | 94.7 | 94.8 | 27.70 |
|  | 400 | 190.8 | 200.4 | 95.2 |  |
|  | 600 | 307.0 | 314.6 | 97.6 |  |
| pitch 65 ton/mm² | 200 | 86.8 | 87.4 | 99.3 | 31.00 |
|  | 400 | 182.0 | 184.8 | 98.5 |  |
|  | 600 | 288.3 | 290.1 | 99.4 |  |
| pitch 70 ton/mm² | 200 | 77.5 | 83.6 | 92.7 | 33.50 |
|  | 400 | 163.5 | 176.8 | 92.5 |  |
|  | 600 | 257.5 | 275.1 | 93.6 |  |
| pitch 75 ton/mm² | 200 | 75.5 | 79.6 | 94.8 | 36.00 |
|  | 400 | 159.5 | 166.9 | 95.6 |  |
|  | 600 | 250.3 | 261.8 | 95.6 |  |

*Figures indicate fiber modulus of elasticity.

Referring to FIG. 2, relative to the ratio between the measured flexion amount and the theoretical flexion amount for a load of 200 g, the ratio α remains substantially unchanged for a load of 400 g. Further, in comparison with the case of 400 g load, the characteristics improve in all the respects for the load of 600 g. This means that the tubular member still retains sufficient elasticity when the flexion amount W, i.e. the magnitude of bending is significantly increased. Hence, if this tubular member is used as a fishing rod, this rod may sufficiently cope with a sudden strong pulling force from fish.

However, if the tubular member is formed solely of the pitch carbon fiber, the member cannot provide sufficient mechanical strength while being capable of providing high elasticity. If this tubular member is subjected to a bending force, a bent portion of the tubular member is squeezed so that the cross section of the tubular member is deformed into a substantially oval shape.

With this, an inner layer of the major-axis portion of the substantially oval cross section is subjected to a compressing force, while an outer layer of the same is subjected to a tensile force. If such bending force is intensified, cracking tends to occur in the tubular member.

Thus, in order to allow the tubular member to be used as, e.g., a fishing rod, the member needs to have a high modulus of elasticity while retaining a necessary amount of mechanical strength.

Table 3 shows characteristics of typical pitch type and PAN type carbon fibers. As may be seen from Table 3, the PAN type carbon fiber provides a higher compression strength than the pitch type carbon fiber, while providing a lower modulus of tensile elasticity than the latter.

TABLE 3

|  | tensile elastic modulus of fiber | compression strength in fiber orientation |
| --- | --- | --- |
| pitch carbon fiber | 60 ton/mm$^2$ | 53 kg/mm$^2$ |
| PAN carbon fiber | 40 ton/mm$^2$ | 120 kg/mm$^2$ |

Accordingly, a primary object of the present invention is to overcome the above-described drawbacks of the conventional art by providing a tubular member for use in, e.g., a fishing rod or a golf club, which is superior in both controllability and strength.

SUMMARY OF THE PREFERRED EMBODIMENTS

In accordance with one aspect of the present invention, there is provided a tubular member formed of a plurality of layers containing carbon fiber impregnated with resin, with the layers being overlaid one on another and configured into a tubular shape. The inventive tubular member includes an inner layer formed of carbon fiber and resin; an intermediate layer comprising a plurality of layers formed of carbon fiber and resin, at least one of the plurality of layers comprising pitch type carbon fiber; and an outer layer formed of carbon fiber and resin.

Preferably, the carbon fibers in the layers of the intermediate layer are substantially axially oriented.

In a preferred embodiment, the intermediate layer includes at least one layer of prepreg containing pitch type carbon fiber impregnated with resin, the pitch type carbon fiber having a modulus of elasticity, and at least one further layer of prepreg containing PAN type carbon fiber impregnated with resin, the PAN type carbon fiber having a modulus of elasticity that is smaller than the modulus of elasticity of the pitch type carbon fiber.

In another preferred embodiment, the intermediate layer includes first and second prepreg layers containing PAN type carbon fiber impregnated with resin, the PAN type carbon fiber having a modulus of elasticity. Sandwiched between the foregoing prepreg layers is another prepreg layer containing pitch type carbon fiber impregnated with resin, the pitch type carbon fiber having a modulus of elasticity greater than the modulus of elasticity of the PAN type carbon fiber.

According to another aspect of the present invention, there is provided a method of making a tubular member as described above. The inventive method includes the steps of: forming an inner layer by winding a prepreg formed of carbon fiber and resin around a mandrel; winding around the inner layer a plurality of layers formed of carbon fiber and resin, at least one of the plurality of layers comprising pitch type carbon fiber, thereby forming an intermediate layer; and winding around the intermediate layer an outer layer formed of carbon fiber and resin.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which FIG. 3 is a graph showing flexion ratios of hybrid members, FIG. 6 is a perspective view of a preferred embodiment of the invention in which a tubular member is formed by winding of prepreg, FIG. 7 is a section view of the tubular member according to the embodiment

DETAILED DESCRIPTION OF THE PREFERRED EMBODIMENTS

Figure 2:
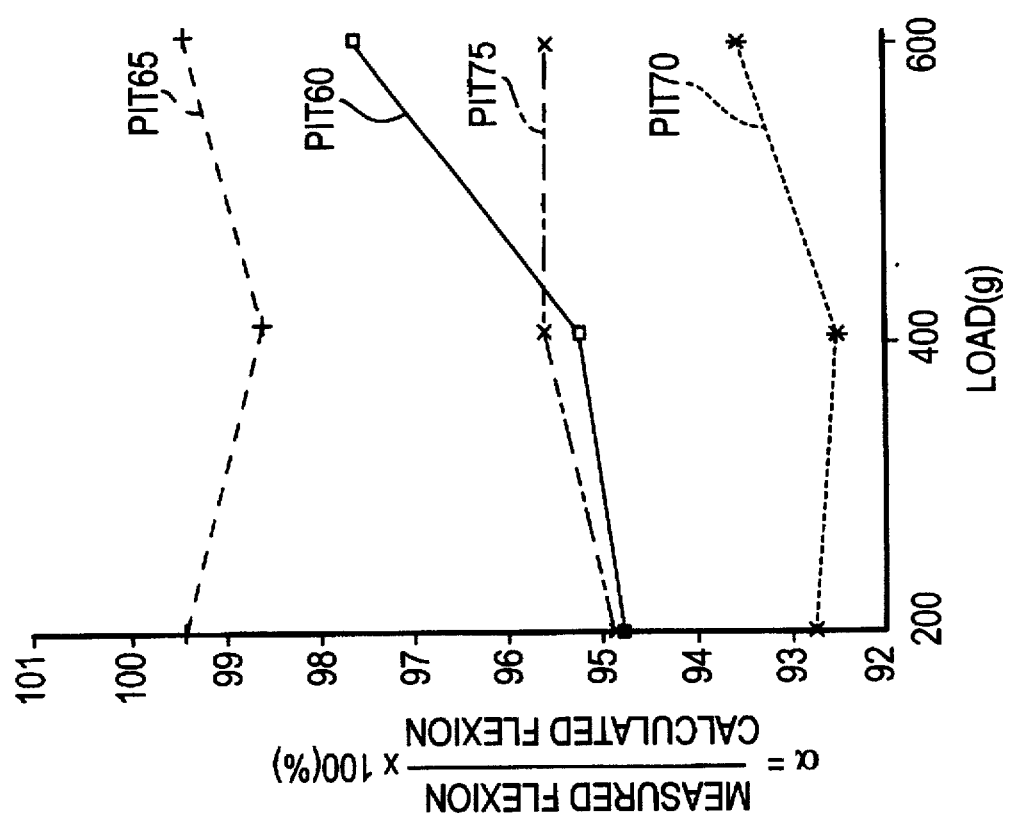
FIG. 2 is a graph showing flexion ratios of tubular members using pitch carbon fiber in an intermediate layer thereof.
Figure 1:
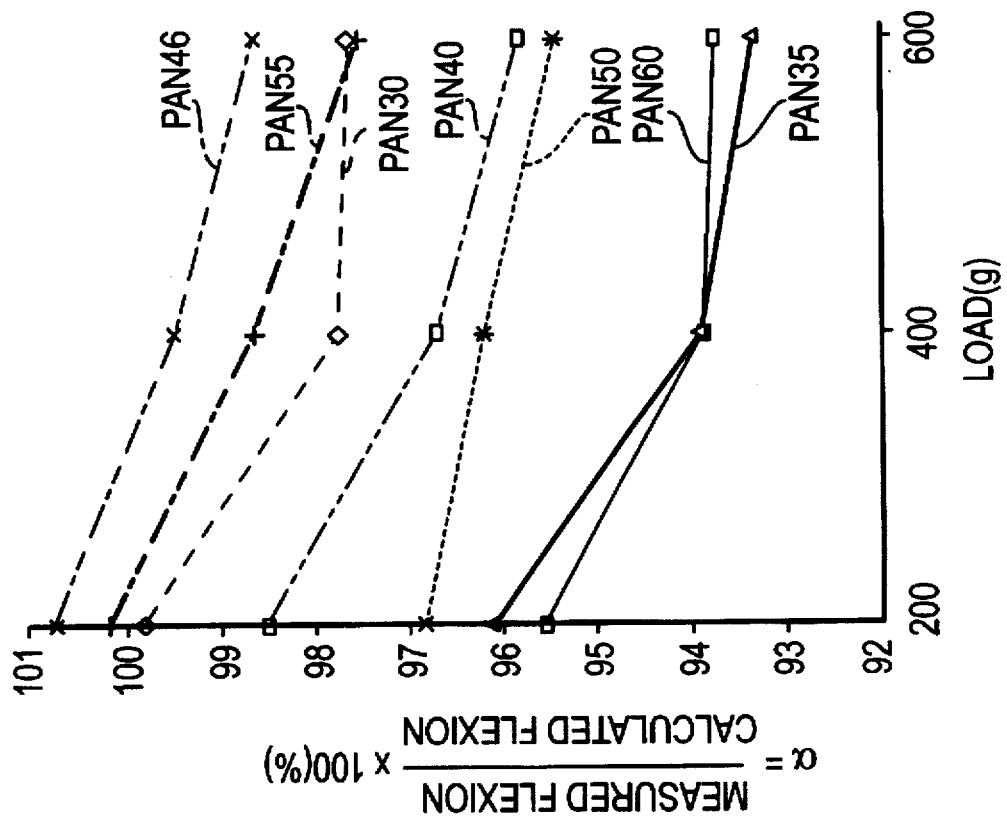
FIG. 1 is a graph showing flexion ratios of conventional tubular members using PAN carbon fiber.

It has been discovered that it is possible to take advantage of the high modulus of elasticity inherent in the pitch type carbon fiber even when the pitch type carbon fiber is used in combination with the PAN type carbon fiber. Thus, if the inventive tubular member is used as a fishing rod, this fishing rod may retain sufficient flexibility even when the rod is bent by pulling from a fish, so that the rod may sufficiently cope with a stronger pulling force, whereby such troubles as breakage of a fishing line or detachment of the hook from the fish may be effectively avoided. Further, if this member is used as a golf club shaft damage hardly occurs in the shaft since the inner and outer layers thereof may retain sufficient strength even when the shaft experiences a strong reaction force causing a significant amount of flexion.

Both PAN and pitch type carbon fibers are well known and can be prepared by a number of methods. PAN and pitch fibers, and methods for preparing them, are described, for example, by S. Yamane, "Carbon Fibers", in *Carbon Fiber* 1985, Chapter D1, pp. D-1 to D-7 (Toray Corporation ACM Technical Group, Tokyo, Japan 1986), which is incorporated herein by reference. PAN type fibers can be commercially obtained, for example, from Toray Corporation and Toho Reiyon Corporation, of Japan. Pitch type fibers can be commercially obtained, for example, from Nippon Steel Corporation, of Japan.

Table 4 and FIG. 3 show flexion characteristics of tubular members of a variety of hybrid constructions each having an intermediate layer formed by winding of prepreg containing pitch carbon fiber and overlaying winding of prepreg containing PAN carbon fiber.

TABLE 4

| | Load | Flexion w (mm) | | $\alpha$ = measured calculated × 100 (%) | Bending Elastic Modulus (ton/mm2) |
|---|---|---|---|---|---|
| | (g) | measured | calculated | | |
| Hybrid 1 | 200 | 88.5 | 91.2 | 97.0 | Values |
| outer: PAN 40 ton/mm² | 400 | 187.5 | 193.0 | 97.2 | calculated based on |
| inner: pitch 70 ton/mm² | 600 | 297.8 | 302.9 | 98.2 | pitch 33.5, PAN 19.5 |
| Hybrid 2 | 200 | 89.3 | 92.3 | 96.7 | |
| outer: pitch 70 ton/mm² | 400 | 187.8 | 195.2 | 96.2 | |
| inner: PAN 40 ton/mm² | 600 | 297.8 | 308.9 | 96.4 | |
| Hybrid 3 outer: PAN 40 ton/mm² | 200 | 77.5 | 83.6 | 92.7 | |
| middle: pitch 70 ton/mm² | 400 | 163.5 | 176.8 | 92.5 | |
| inner: PAN 40 ton/mm² | 600 | 257.5 | 275.1 | 93.6 | |

Referring to FIG. 3, in the case of a hybrid member 1, with the load of 600 g causing a large amount of flexion, the ratio a of the measured flexion amount relative to the theoretical flexion amount approaches 100%. That is, with the decrease in the measured elastic modulus of the tubular member, this measured value approaches the theoretical elastic modulus used in the calculation of the theoretical flexion amount. In the case of a hybrid member 2, as the testing load is varied from 200 g, 400 g and then to 600 g, the ratio hardly varies. Hence, the elastic modulus of this member may be considered to be substantially constant. In the case of a further hybrid member 3, although the elastic modulus exceeds the theoretical value for the load of 400 g, the modulus again slightly approaches the theoretical value for the load of 600 g.

Before describing preferred embodiments of the invention, there will be described the method used in the measurement of flexion amounts W shown in Tables 1, 2 and 4.

Figure 4:
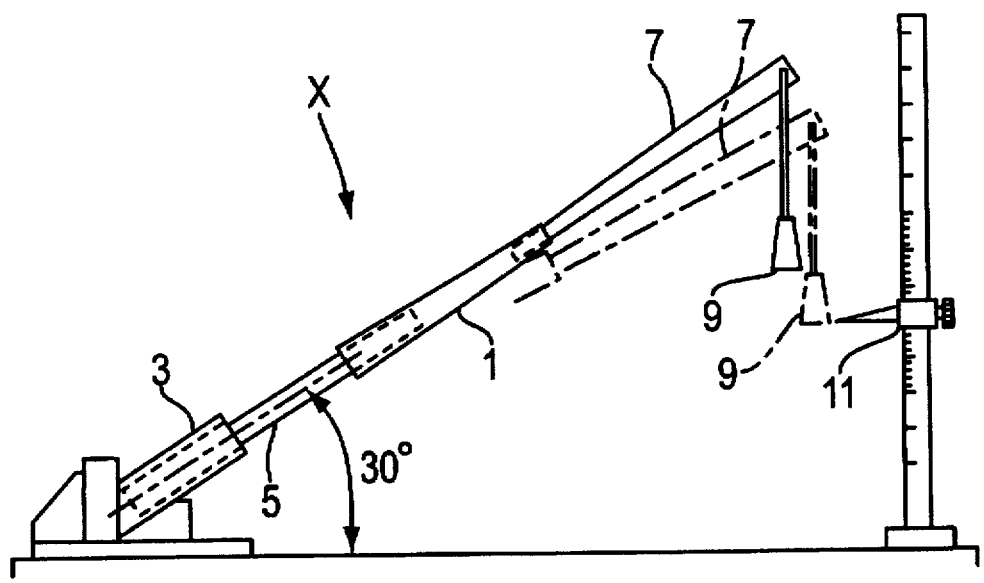
FIG. 4 is a construction view of a flexion measuring device.

As shown in FIG. 4, a flexion amount measuring device X includes a mount table 3 to which a test piece 1 out into a piece of 1 m length is attached, a round bar 5 to be attached to a butt end of the test piece 1, a further round bar 7 to be attached to a leading end of the test piece 1, a weight 9 and a reader member 11. The mount table 3 has a sufficient rigidity so as not to affect measurements to be effected thereon.

Referring to the test piece 1 which provided the results of Table 4, in a hybrid member 1, a PAN type carbon fiber was used for forming inner and outer layers A, C. This PAN carbon fiber has an elastic modulus of 24 ton/mm², a carbon fiber density of 27.5 g/m², and a resin amount of 42 wt %. An intermediate layer B of the test piece 1 is formed of a combination of a PAN carbon fiber and a pitch type carbon fiber, with the PAN carbon fiber having a modulus of elasticity of 40 ton/mm², a carbon fiber density of 150 g/m², and a resin amount of 24 wt %, the pitch type carbon fiber having a modulus of elasticity of 70 ton/mm², a carbon fiber density of 150 g/m² and a resin amount of 25 wt %, respectively.

In a hybrid member 2, in comparison with the above-described hybrid member 1, in the intermediate layer B, the arranging order of the PAN carbon fiber and the pitch carbon fiber is reversed from each other between the inner side and the outer side.

A hybrid member 3 has a triple-layered intermediate layer B, and the inner and outer layers of this intermediate layer are formed of PAN carbon fiber.

The inner and outer layers A, C of this hybrid member 3 are the same as those of the hybrid member 1. The PAN carbon fiber used in this hybrid member 3 has a modulus of elasticity of 40 ton/mm², a carbon fiber density of 75 g/m², and a resin amount of 24 wt %.

The round bars 5, 7 comprise drawn material with tapered cutting having a modulus of elasticity of 24 ton/mm² and a 50% volumetric content of carbon fiber.

Figure 5:
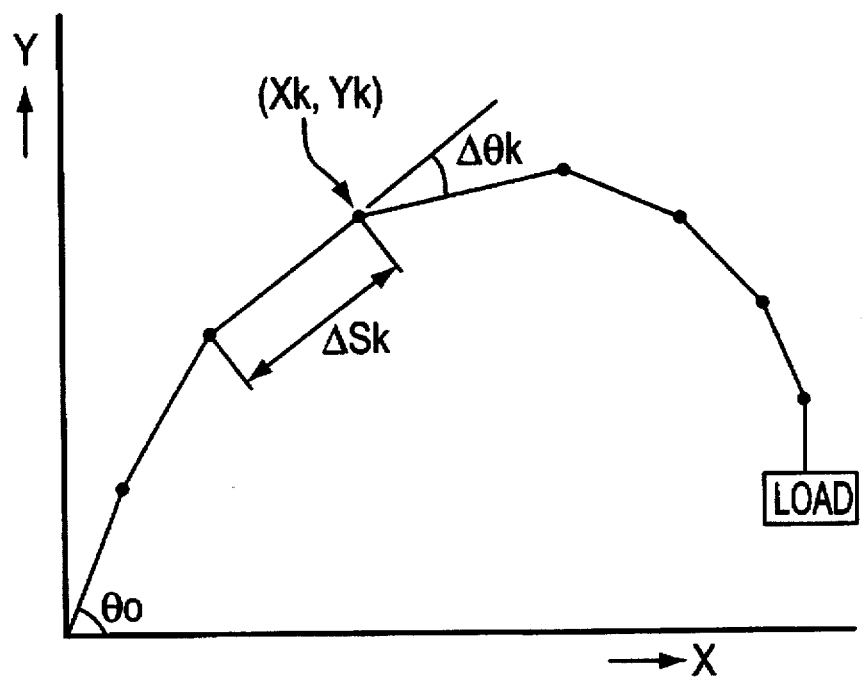
FIG. 5 is an x-y coordinate graphic illustration of a flexed tubular member shown as being divided into a plurality of segments of an equal length.

Next, prior to the measurements of the flexion amounts W, theoretical values of the flexion amounts W under a fixed modulus of elasticity are calculated. As shown in FIG. 5, the test piece 1, the round bar 5 and the round bar 7 are divided into 200 segments of an equal length. Then, by applying the flexion expression commonly used in the field of strength of materials, flexion angles are obtained. Then, by using these obtained flexion angles and applying difference calculus, the flexion amounts W are obtained. In case the piece or the bar has a relatively short length, the same is divided into 100 same-length segments, rather than 200 segments.

Specifically, the calculation is made by using the general expression:

$$d\theta/ds = M/EI$$

where $\theta$ is a flexion angle, S is a length, M is a bending moment, E is a modulus of elasticity and I is a sectional secondary moment, respectively.

If the above expression is applied to each of the n-divided segments; then, $$\Delta\theta_1/\Delta S_1 = M_1/E_1 I_1$$
$$\downarrow$$
$$\Delta\theta_n/\Delta S_n = M_n/E_n I_n$$

where $\Delta\theta_k$: an angle formed between the 'k'-th segment and (k+1)-th segment, $\Delta S_k$: a length of the 'k'-th segment $E_k$: a modulus of elasticity at a middle point of the 'k'-th segment, $I_k$: a sectional secondary moment at the middle point of the 'k'-th segment, $M_k$: a moment due to a load at the middle point of the k-th segment.

In the above, $\Delta S_k$ is determined by the segment length, $E_k$ is determined by the material composition of the middle point of the segment, $I_k$ is determined by the inner and outer diameters of the middle point of the segment, $M_k$ is determined by the horizontal distance between the middle point of the segment and the point of load application and the magnitude of the load.

From the above, the angle $\Delta\theta_k$ is obtained. Then, as shown in FIG. 5, if the x-y coordinates of the number k position and the number (k+1) position are $(X_k, Y_k)$, $(X_{k+1}, Y_{k+1})$, respectively.

The positions of the segments are expressed as, $$X_{k+1}=X_k+\Delta S_k \cos(\theta_0-\Sigma_{i=1,k}\Delta\theta_i)$$

$$Y_{k+1}=Y_k+\Delta S_k \sin(\theta_0-\Sigma_{i=1,k}\Delta\theta_i)$$

Thus, $(X_n, Y_n)$ may be calculated, from which the flexion amounts W may be derived. Table 4 show the values theoretically obtained in the above-described manner and the measured values. FIG. 3, which was drafted based on the data of Table 4, show that the measured flexion amounts of the materials are closer to the theoretically obtained values with the application of 600 g load than with the application of 400 g load. This indicates that with these hybrid structures, in comparison with the PAN carbon fiber structures, the increase of the modulus of elasticity under a high load is restricted, thus providing improved elasticity characteristics.

Turning now to the preferred embodiment of the present invention illustrated in FIGS. 6(a) and 7, each of an inner layer A, an intermediate layer B and an outer layer C is formed into a tubular shape by winding of a prepreg, containing carbon fiber 13 impregnated with resin 15, in order around a mandrel 10. In this, the alignment orientation Si of the carbon fiber of the inner layer A is set substantially circumferentially, i.e., along the periphery of the tubular member, while the alignment orientation Sm of the carbon fiber of the intermediate layer B is set substantially axially, i.e., along the axis of the tubular member.

Both of the inner layer A and the intermediate layer B are formed by winding of a prepreg. On the other hand, for forming the outer layer C, as shown in FIG. 6(b), the prepreg preferably is rendered into a prepreg tape Ct having a narrow width relative to the length of the tubular member, for example a width of approximately 5 mm. This prepreg tape Ct is wound in such a manner that the fiber orientation So of the outer layer is aligned substantially circumferentially, along the peripheral direction of the tubular member, and also that side edges of neighboring turns of the tape Ct are placed in abutment to each other without their overlapping. In the case of this construction using the winding of the tape Ct having a narrower width than the prepreg sheets forming layers A and B, a winding tension acts uniformly over the entire width of the tape Ct, so that formation of wrinkle may be avoided advantageously. Consequently, it is possible to provide more firm contact between the outer layer C and the intermediate layer B, thereby to improve the strength of the entire rod. Incidentally, when desired, the fiber alignment orientation So of the outer layer C may be set substantially axially, along the axis of the tubular member.

Though not shown, after the above, on the wound outer layer C, a polyester forming tape is wound in an overlapping manner (as is known in the art). The wound tubular member is then baked. After this baking, the polyester tape is removed, and a painting job is done on the surface of the tubular member, thereby to finish the member as, e.g. a fishing rod.

In this particular embodiment, the intermediate layer B includes a first layer Bo contacting the outer layer C, a second layer Bm contacting an inner face of the first layer Bo, and a third layer Bi contacting an inner face of the second layer Bm. The first layer Bo and the third layer Bi preferably comprise PAN carbon fiber, while the second layer Bm preferably comprises pitch carbon fiber. That is, the intermediate layer B is formed as a triple-layer construction in which the windings of at least two layers of prepreg including the PAN carbon fiber impregnated with resin bind therebetween the prepreg layer of pitch carbon fiber having a greater modulus of elasticity than the PAN type carbon fiber. With this construction, by the ingenious combination of the high elastic modulus, i.e. high rigidity inherent in the pitch type carbon fiber, and the superior mechanical strength inherent in the PAN type carbon fiber, the tubular member having this construction will be less vulnerable to, e.g. inner cracking.

The following are exemplary specifications of the prepregs forming the respective layers.

Of those prepregs constituting the intermediate layer B, the specifications of the prepregs containing the PAN type carbon fiber are: an elastic modulus of 40 ton/mm², a carbon fiber density of 75 g/m², a resin content of 24 wt %. The specifications of the prepreg containing the pitch type carbon fiber are: an elastic modulus of 70 ton/mm², a carbon fiber density of 150 g/m², a resin content of 25 wt %. On the other hand, the prepregs containing PAN carbon fiber for forming the inner layer A have the following specifications: an elastic modulus of 30 ton/mm², a carbon fiber density of 30 g/m², a resin content of 40 wt %. The prepreg tapes containing PAN carbon fiber for forming the outer layer C have the following specifications: an elastic modulus of 30 ton/mm², a carbon fiber density of 23 g/m², and a resin content of 40 wt %.

Each of the prepregs of the intermediate layer B is formed into a thickness of approximately 0.2 mm, while each of the prepregs of the inner and outer layers A, C is formed into a thickness of approximately 0.03 mm, respectively.

Figure 8:
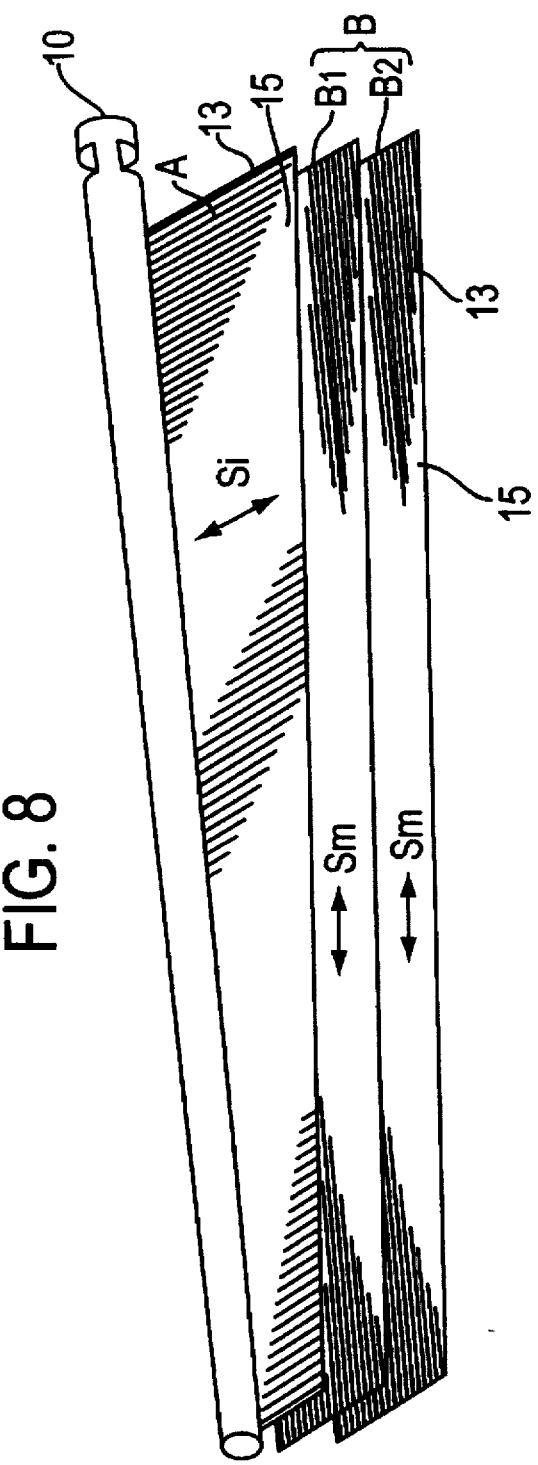
FIG. 8 is a perspective view of a further embodiment of the invention in which a tubular member is formed by winding of prepreg.
Figure 9:
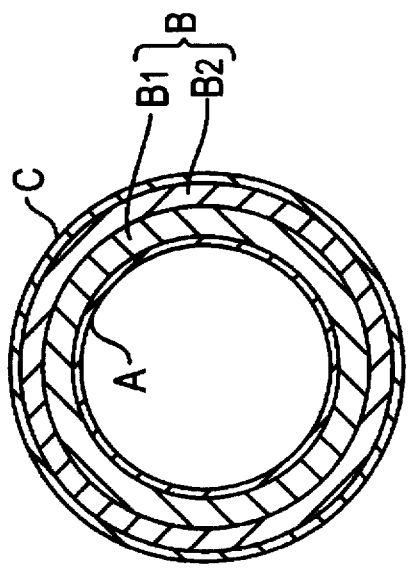

FIGS. 8 and 9 show a second embodiment of the present invention.

In this embodiment, the intermediate layer B is provided as a double-layer construction B1 or B2 consisting solely of the first layer Bo and the second layer Bm or of the second layer Bm and the third layer Bi, respectively. In this case, however, both of the two layers forming the double-layer construction B1, B2 are formed of prepregs having pitch type carbon fiber, with the fiber alignment orientation being set substantially axially, along the axis of the tubular member. This pitch type carbon fiber has the following specification: an elastic modulus of 60 to 75 ton/mm², a carbon fiber density of 150 g/m², a resin content of 25 wt %. In the case of the construction of this embodiment the peripherally oriented PAN type carbon fibers of the inner and outer layers A, C function to compensate for the insufficient strength of the pitch type carbon fiber of the intermediate layer B. The specifications of the prepreg having PAN type carbon fiber for forming the inner layer A are: an elastic modulus of 30 ton/mm², a carbon fiber density of 30 g/m², a resin content of 40 wt %. The resin tape containing the PAN type carbon fiber and forming the outer layer C has the following specification: an elastic modulus of 24 ton/mm², a carbon fiber density of 27.5 g/m² and a resin content of 42 wt %.

Figure 10:
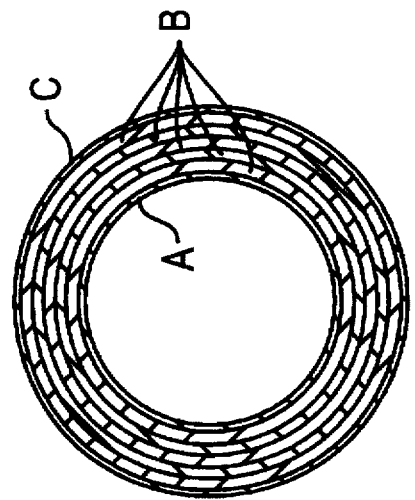
FIG. 9 is a section view of the tubular member according to the further is embodiment and FIG. 10 is a section view of a tubular member according to a still further embodiment in which the tubular member has a multi-layered intermediate layer arrangement.

More generally, as shown in FIG. 10, the intermediate layer B may be provided as any other multiple-layered construction having a desired number of layers including the PAN type carbon fiber layers and pitch type carbon fiber layers in a mixed state, i.e. having layers including PAN type carbon fibers and other layers including pitch type carbon fibers.

In addition to the above, irrespective of the number of layers forming the intermediate layer B, the pitch carbon fiber used in this intermediate layer B may provide a modulus of elasticity ranging substantially above 60 ton/ mm², while the PAN type carbon fiber used in the same may provide a modulus of elasticity ranging substantially below 60 ton/mm². A tubular member provided with this construction too may provide favorable characteristics.

What is claimed is:

1. A tubular member formed of a plurality of layers containing carbon fibers impregnated with resin, with the layers being overlaid one on another and configured into a tubular shape, said tubular member comprising:

(a) an inner layer formed of carbon fibers and resin;
   (b) an intermediate layer consisting essentially of a plurality of layers formed of carbon fibers and resin, at least one of said plurality of layers comprising pitch carbon fibers, all of said carbon fibers being substantially axially oriented and having a modulus of elasticity not less than 60 ton/mm², said intermediate layer comprising first and second prepreg layers containing PAN carbon fibers impregnated with resin, said PAN carbon fibers having a modulus of elasticity, and sandwiched therebetween, a prepreg layer containing pitch carbon fibers impregnated with resin, said pitch carbon fibers having a modulus of elasticity greater than the modulus of elasticity of said PAN carbon fibers; and
   (c) an outer layer formed of carbon fibers and resin.

2. A tubular member as claimed in claim 1, wherein said carbon fibers in said inner and outer layers are substantially circumferentially oriented.

3. A tubular member as claimed in claim 1, wherein said carbon fibers in said outer layer are substantially axially oriented.

4. A tubular member as claimed in claim 1, wherein said intermediate layer comprises at least one layer of prepreg containing pitch carbon fibers impregnated with resin, said pitch carbon fibers having a modulus of elasticity, and at least one further layer of prepreg containing PAN carbon fibers impregnated with resin, said PAN carbon fibers having a modulus of elasticity that is smaller than the modulus of elasticity of said pitch carbon fibers.

5. A tubular member as claimed in claim 4, wherein said modulus of elasticity of said PAN carbon fibers is not more than 60 ton/mm².

6. A tubular member as claimed in claim 5, wherein said modulus of elasticity of said PAN carbon fibers is not less than 40 ton/mm².

7. A tubular member as claimed in claim 2 wherein said modulus of elasticity of said pitch carbon fibers forming said intermediate layer is not less than 60 ton/mm² and said modulus of elasticity of said PAN carbon fibers is not more than 60 ton/mm².

8. A tubular member as claimed in claim 7 wherein said modulus of elasticity of said PAN carbon fibers is not less than 40 ton/mm².

9. A tubular member as claimed in claim 1, wherein said inner layer and said outer layer comprise PAN carbon fibers which are substantially circumferentially oriented.

10. A tubular member as claimed in claim 9, wherein said intermediate layer comprises two prepregs containing pitch carbon fibers which are substantially axially oriented.

11. A method of making tubular member formed of a plurality of layers containing carbon fibers impregnated with resin, with the layers being overlaid one on another and configured into a tubular shape, said method comprising the steps of:

(i) forming an inner layer by winding a prepreg formed of carbon fibers and resin around a mandrel;
   (ii) winding around said inner layer a plurality of layers formed of carbon fibers and resin, at least one of said plurality of layers consisting essentially of pitch carbon fibers, all of said carbon fibers being substantially axially oriented and having a modulus of elasticity not less than 60 ton/mm², said plurality of layers being formed from at least one layer of prepreg containing pitch carbon fibers impregnated with resin, said pitch carbon fibers having a modulus of elasticity, and at least one further layer of prepreg containing PAN carbon fibers impregnated with resin, said PAN carbon fibers having a modulus of elasticity that is smaller than the modulus of elasticity of said pitch carbon fibers, thereby forming an intermediate layer; and (iii) winding around said intermediate layer an outer layer formed of carbon fibers and resin.

12. A method as claimed in claim 11, wherein said carbon fibers in said inner and outer layers are substantially circumferentially oriented.

13. A method as claimed in claim 12, wherein said carbon fibers in said inner and outer layers are PAN carbon fibers.

14. A method as claimed in claim 11, wherein said carbon fibers in said outer layer are substantially axially oriented.

15. A method as claimed in claim 11, wherein said intermediate layer is formed from at least one layer of prepreg containing pitch carbon fibers impregnated with resin, said pitch carbon fibers having a modulus of elasticity, and at least one further layer of prepreg containing PAN carbon fibers impregnated with resin, said PAN carbon fibers having a modulus of elasticity that is smaller than the modulus of elasticity of said pitch carbon fibers.

16. A method as claimed in claim 11, wherein said outer layer is formed by spiral winding of a prepreg tape on an outer surface of said intermediate layer.

17. A tubular member made by the method of claim 11.

18. A tubular member made by the method of claim 16.

* * * * *